(No Model.) 4 Sheets—Sheet 1.

D. & W. L. CHASE.
MACHINE FOR SAWING SHINGLES.

No. 398,230. Patented Feb. 19, 1889.

Witnesses,
James W. Redmond.
Chas. F. Drew

Inventors.
Denison Chase
Wm. L. Chase
by their atty
Chas. F. Perkins (No Model.) 4 Sheets—Sheet 3.

D. & W. L. CHASE.
MACHINE FOR SAWING SHINGLES.

No. 398,230. Patented Feb. 19, 1889.

Witnesses:

Inventors.

(No Model.) 4 Sheets—Sheet 4.

D. & W. L. CHASE.
MACHINE FOR SAWING SHINGLES.

No. 398,230. Patented Feb. 19, 1889.

Witnesses:

Inventors.

UNITED STATES PATENT OFFICE.

DENISON CHASE, OF ORANGE, AND WILLIAM L. CHASE, OF WORCESTER, MASSACHUSETTS.

MACHINE FOR SAWING SHINGLES.

SPECIFICATION forming part of Letters Patent No. 398,230, dated February 19, 1889.

Application filed August 29, 1885. Serial No. 175,629. (No model.)

*To all whom it may concern:*

Be it known that we, DENISON CHASE, a citizen of the United States, residing at Orange, in the county of Franklin and State of Massachusetts, and WILLIAM L. CHASE, a citizen of the United States, residing at Worcester, in the county of Worcester and said State of Massachusetts, have invented certain new and useful Improvements in Machines for Sawing Shingles; and we do hereby declare that the following is a full, clear, and exact description of the invention, which will enable others skilled in the art to which it appertains to make and use the same.

This invention relates to the well-known class of shingle-machines in which the block, cut to the length of the stuff to be sawed, is held upright between toothed rollers mounted upon a reciprocating carriage, and is automatically fed forward between the rollers and presented to a circular saw.

The objects aimed at are, first, to secure perfect accuracy in feeding the block forward, thus making the product uniform in thickness; second, to secure a uniform movement of the carriage upon the forward or cutting stroke and a quick return-stroke, thereby keeping the saw evenly strained when in work, and saving time; third, to provide an automatic stop-motion which shall arrest the motion of the carriage when the block is sawed up, or at any other time, by the will of the operator, and at exactly the proper point for putting in a fresh block; fourth, to provide a box that will receive and hold the shingles as they fall from the saw, but that will not fill up with sawdust; fifth, in the design and arrangement of parts to provide a durable machine which can be conveniently operated by one man, or which can with equal convenience be made to keep two or three operators busy.

We will now describe the construction and operation of a machine embodying our improvements, which will then be specifically pointed out in the claims.

Figure 1:
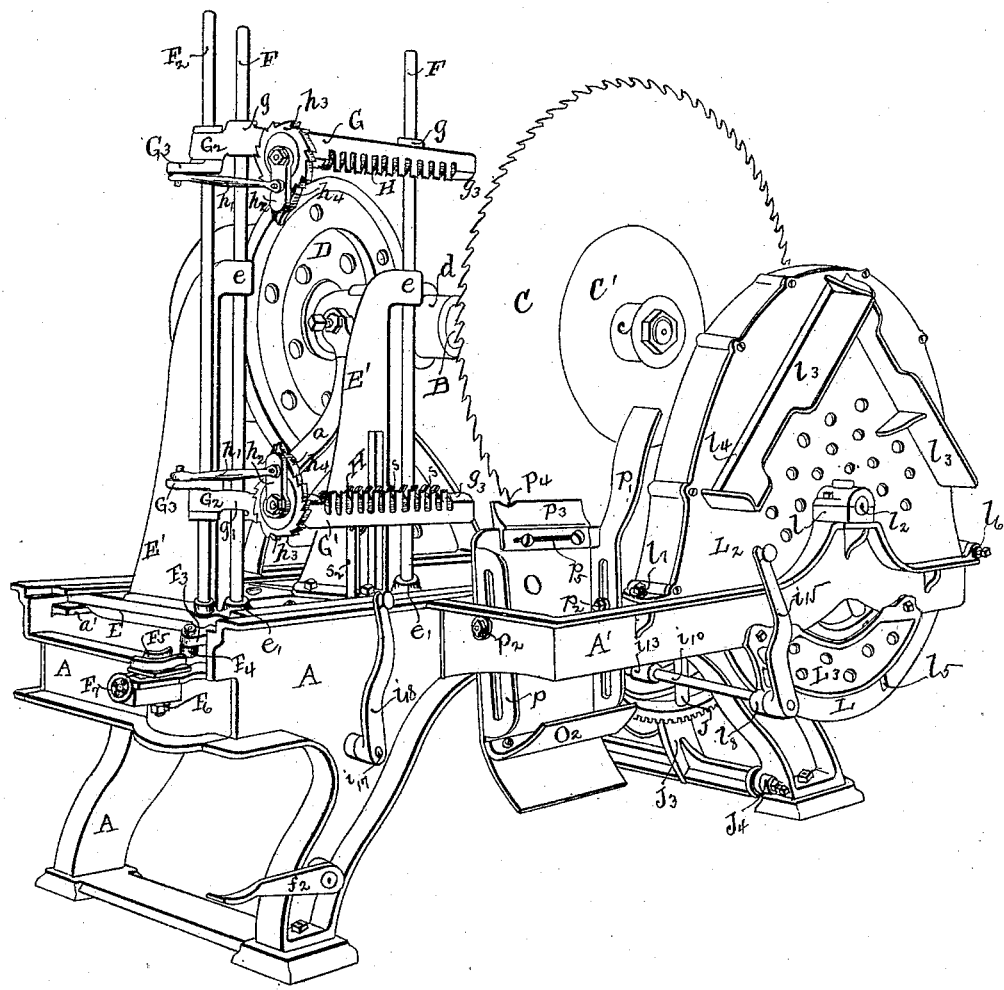
Figure 2:
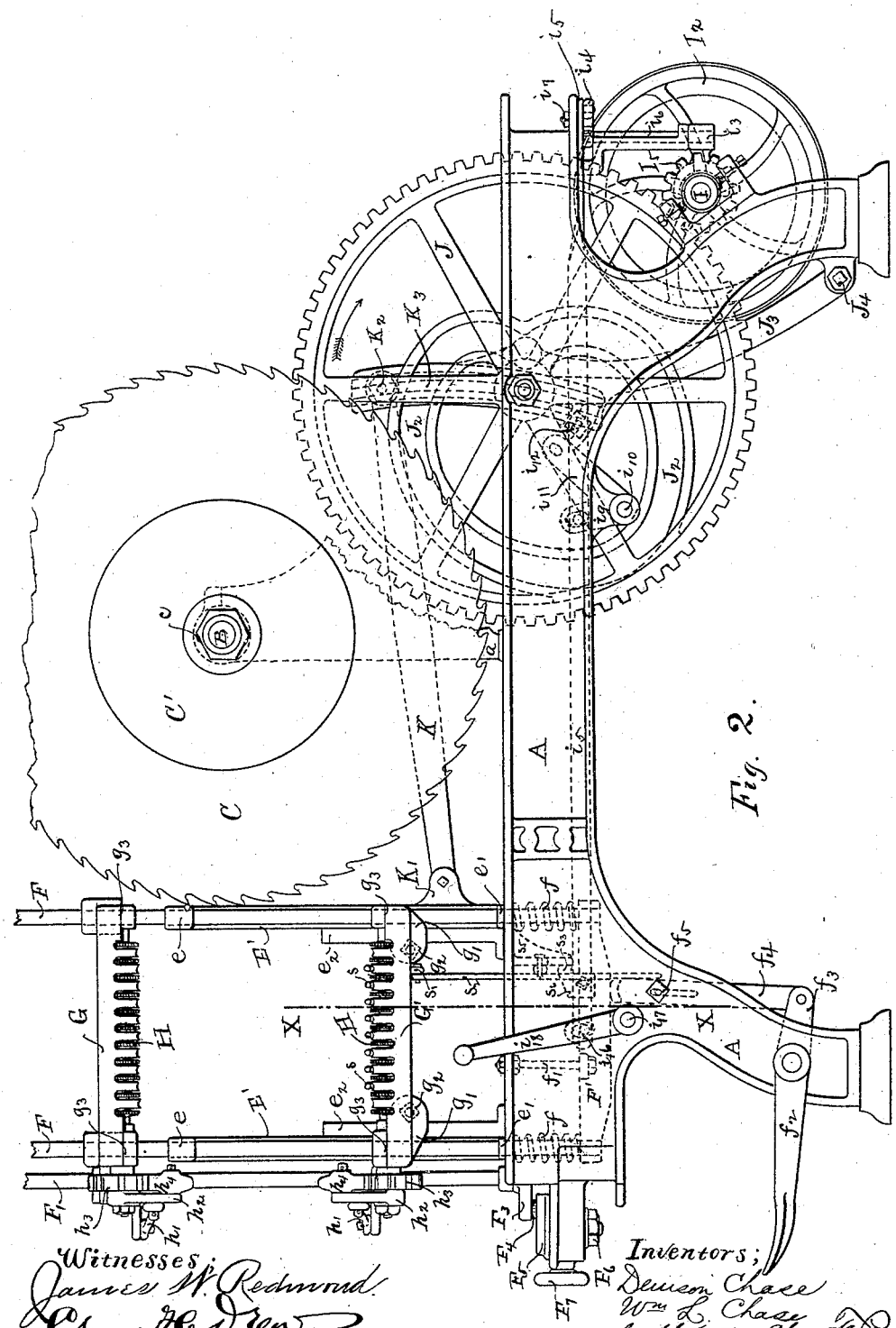
Figure 3:
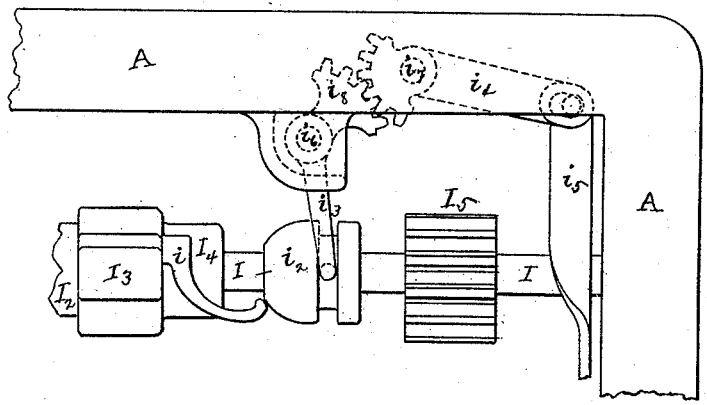
Figure 4:
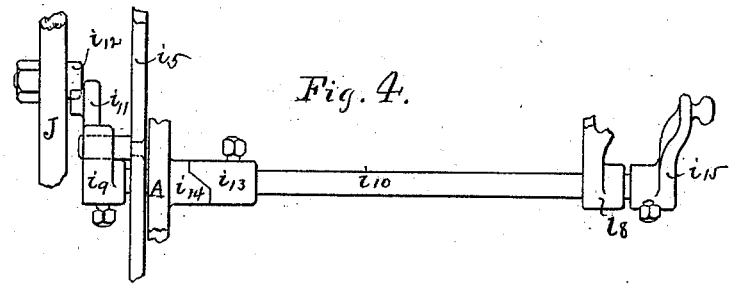
Figure 5:
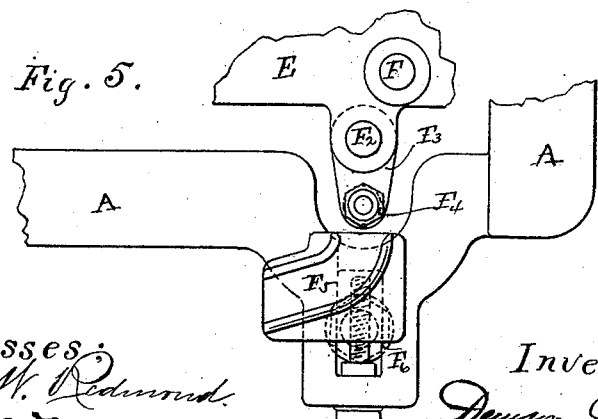
Figure 6:
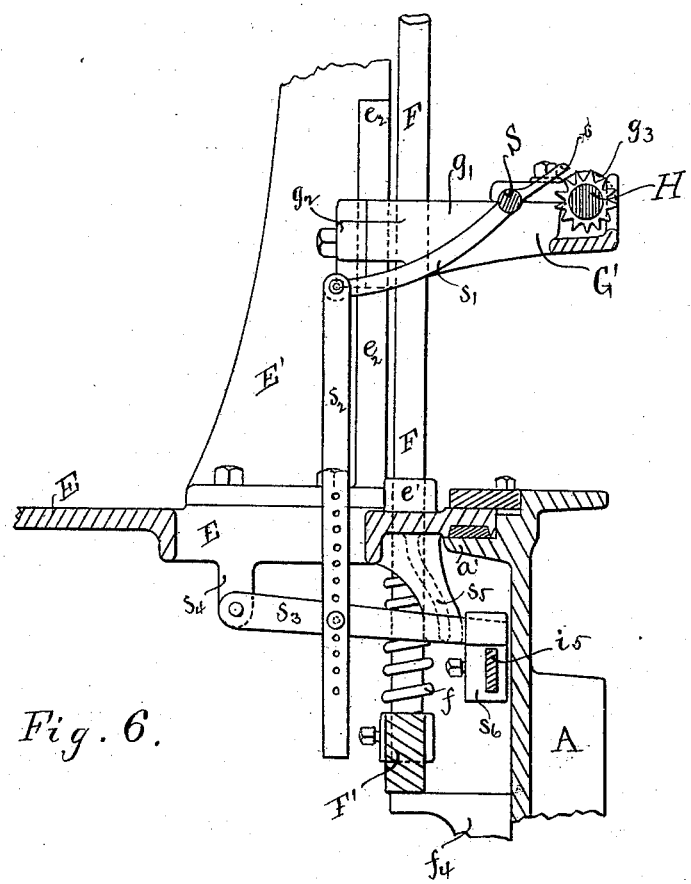

In the accompanying drawings, Figure 1 is a perspective view. Fig. 2 is a side elevation front with parts removed. Figs. 3, 4, and 5 are detached detail views in plan. Fig. 6 is a partial sectional elevation on line X X, Fig. 2.

A represents the frame of the machine, of cast-iron, ribbed. Bolted to the frame A, Figs. 1 and 2, are the uprights $a$, upon which is journaled the arbor B, which carries rigidly upon its front end the saw C and upon its rear end the balance-wheel-driving pulley D, through which motion is communicated to the whole machine. The saw-plate C is screwed in the usual way to the flange C', which terminates in the pulley $c$. A cone-pulley, $d$, is also carried rigidly upon the arbor B, whose purpose will be explained further on.

Cast upon the frame A are the ways $a'$, upon which rests and slides the reciprocating carriage-base E. Bolted to the base of the carriage are the uprights E', through bearings $e$ in which and through bearings $e'$ in the carriage-base slide freely the rods F. Upon the upper ends of the rods F slides freely the set-roll hanger G, which may be secured in any desired position on the rods by set-screws on the back sides of the hubs $g$. On the lower ends of the rods is fastened the cross-bar F', confining between it and the carriage-base the coil-springs $f$, the tension of which may be adjusted by means of a bolt, $f'$, fastened to the carriage-base by check-nuts and passing loosely through an ear on the cross-bar F'. The tension of the springs may be overcome and the rods carrying the set-roll hanger G may be lifted by means of the treadle $f^2$, arm $f^3$, and slide $f^4$, which is held upright and permitted to move vertically by means of the bolt and slot $f^5$, and which is provided with an ear resting under the cross-bar F'.

Clamped to the ribs $e^2$ of the carriage-uprights E' by arms $g'$ and caps and bolts $g^2$ is the lower set-roll hanger, G', having its face parallel with that of the upper set-roll hanger, G. By loosening the clamp-bolts $g^2$, Figs. 1 and 6, the lower hanger may be slid upon the ribs $e^2$ and adjusted vertically to any desired position, thus enabling the operator to so adjust the set-rolls as to bring the center of any length of block within the range of the machine opposite the center of the saw, which permits the sawing of longer stuff than could be done with the lower rod fixed in the usual way in the proper place for sawing shingles, and which permits the sawing of any width stuff with a shorter stroke than could be done with the center of the block above or below the center of saw.

The set-roll hangers G and G' are provided with projecting hubs $G^2$, Fig. 1, into which are fitted loosely in vertical alignment with each other the sleeves $G^3$, which are held in place by collars on the ends of the sleeves which project through the hubs. Passing loosely through the sleeves $G^3$ and a bearing in the carriage-base is the rod $F^2$, which is splined its whole length, except a short distance at the bottom. The sleeves $G^3$ are provided with a feather fitted to the spline, which allows the sleeves free vertical movement on the rod $F^2$, but compels them to rotate in unison with it.

Resting in bearings $g^3$ on the ends of the set-roll hangers G and G' are the toothed set-rolls H, whose teeth project a little above the points of the hangers, and between which the block to be sawed is held, a sufficient grip being given by the weight of the parts depending upon the rods F, aided by the spiral springs $f$.

Upon the projecting ends of the set-rolls H are fastened rigidly the ratchet-wheels $h^3$, and held loosely beside them by means of threads and nuts are arms $h^2$, upon the ends of which, fitted to engage the teeth of the ratchet-wheels, are pawls $h^4$. The pawls are pressed upon the ratchets by flat springs fastened to the arms $h^2$ and bearing upon the pawls.

The arms of the sleeves $G^3$ and the arms $h^2$ of the set-rolls are connected by the rods $h'$, through which mechanism the partial rotation of the rod $F^2$ compels the rotation of the set-rolls H, and the consequent feeding forward of a block held between the rollers.

Shingles are sawed by the well-known device of long and short notches adjacent on the ratchet-wheels, the rolls being set opposite, so that as one sets a butt the other sets a point. Stuff of even thickness at both ends is sawed by making the ratchet-teeth even.

Fast upon the lower end of rod $F^2$ is an arm, $F^3$, Figs. 1, 2, and 5, carrying upon its end a roller, $F^4$, free to turn upon a stud. The roller is adapted to travel in a curved slot on the top of the plate $F^5$, fastened to a projection of the frame A by nut $F^6$, and adjustable horizontally on the projection by means of the screw $F^7$, which passes through a nut cast to the plate $F^5$. When the reciprocating carriage moves back, the action of the roller $F^4$ entering the slot turns the point of the arm to the left a distance determined by the position of the plate, the carriage always reversing at the same point, which movement partially rotates the rod $F^2$, and thereby draws back the pawls $h^4$ the required distance to make the desired thickness to be cut. When the carriage moves forward, the slot turns the arm back to its former position and accomplishes the set.

The carriage is reciprocated by means of the following mechanism: Hung in pivot-boxes on the back legs of the frame is the counter-shaft I, Figs. 2 and 3. Turning freely upon it is the cone-pulley $i^2$, confined by stay-collars in line properly for a belt with the small cone-pulley $d$ fast on the saw-arbor. The hub of the pulley $I^2$, Fig. 3, is embraced by the friction-clutch $I^3$, which turns freely over it. The clutch is fast by the end $I^4$ to the shaft and serves as a stay-collar for the pulley on this end. The chamber $I^3$ has within it, and encircling the hub, a split ring, which can be contracted to strongly grip the hub by moving the lever $i$ outwardly from the shaft. The movement of lever $i$ is accomplished by sliding the cone $i^2$ toward the hub, and is returned to the position shown in Fig. 3, when the cone is slid away from the hub by a spring within the chamber. The clutch as constructed is in common use and need not be more fully shown. The cone is operated by means of the fork $i^3$, which has projecting points resting in the groove of the cone, and which is pivoted fast on the vertical shaft $i^6$, upon the upper end of which is fast the toothed sector $i^8$, engaging with which is the arm $i^4$, pivoted upon stud $i^7$, upon which it may turn freely. In the end of the arm $i^4$ is a slot which receives a stud fast in the rod $i^5$, to which convenient shippers are attached, as explained further on.

It will be seen that the movement of the rod $i^5$ in the direction of the length of the machine will slide the cone on the shaft I. Also fast to the shaft I is the toothed pinion $I^5$, which engages with the gear-wheel J, which may turn freely upon a stud fast to the side of the frame A, as shown in Fig. 2. Upon the arms of gear-wheel J is constructed the heart-cam $J^2$, made up of a double flange, as shown. Passing freely in the groove thus formed is a hardened-steel roller, which turns freely upon a stud fast in the oscillating lever $J^3$, which is pivoted to the frame A by the pivot-screws $J^4$.

In the upper end of the lever $J^3$ is a T-slot, $K^3$, in which may slide a square head-bolt, $K^2$, upon which are a sleeve and nut. Fitting loosely over the sleeve is the end of connecting-rod K, the other end of which is pivoted to the carriage at $K'$. The cam-wheel J, by the connections just described, turns in the direction of the arrow one complete revolution, making a complete oscillation of the lever $J^3$, and by its connection K making one forward and one return stroke of the carriage. Of course the distance traveled by a point on the oscillating lever $J^3$ is less as the point is moved toward the pivot $J^4$, so that by sliding the bolt $K^2$, and with it the end of connecting-rod K downward in the slot $K^3$, the length of the stroke of the carriage may be conveniently adjusted to suit different sizes of blocks to be cut. The slot $K^3$ is made the arc of a circle, whose center is at $K'$, and the curve is struck with the lever $J^3$ in the forward position, (shown in Fig. 2,) so that whatever is the position of bolt K² in the slot—i. e., whatever the length of the stroke—the carriage will always return to the same point.

The shipper-rod $i^5$, supported by lugs on the side of the frame through which it may slide freely, is extended nearly to the front end of the machine, where it terminates with a stud, $i^{16}$, which engages a slot in the end of arm $i^{18}$, which is pivoted on shaft $i^{17}$, which extends out through the frame A and has the shipper-lever $i^{18}$ fastened to it in a convenient position. It will be seen that the movement of the shipper-lever $i^{18}$ will engage and disengage the clutch $I^3$, and thus start or stop the movement of the cam-wheel J and the carriage E.

Toward the back end of the machine, fast to the shipper-rod $i^5$, is another stud, which engages a slot in an arm, $i^9$, which is pivoted upon the shaft $i^{10}$, which extends out in front of the machine, and has fastened to it another shipper-lever, $i^{15}$, similar to $i^{18}$. This shaft may slide freely in its bearings in the direction of its length a distance determined by the position of the collar $i^{13}$ with reference to the hub of the arm $i^9$. The collar $i^{13}$ and the end of bearing $i^{14}$, Fig. 4, are provided with lugs projecting toward each other, which are fitted together through an angle of ten or fifteen degrees on a spiral surface about the shaft. It will be seen that when the shipper-lever is thrown to the right the shaft may be pushed in so the spiral lugs will coincide, and that when so pushed in and the shipper-lever thrown to the left the spiral lugs will operate to push the shaft outward again.

Cast integral with arm $i^9$, Figs. 2 and 4, is an arm, $i^{11}$, which has upon its outer end a projecting lug on the side away from the frame and toward the cam-wheel J, between which the shipper rod and arm are located. Near the hub of cam-wheel and extending a short distance on the arc of a circle is a slot, through which passes the bolt $i^{12}$. The shaft $i^{10}$ is so located that when the shipper-lever is thrown to the right and the shaft pushed in the lug on arm $i^{11}$ falls in the circular path of the projecting head of bolt $i^{12}$. It will be seen, the cam-wheel being in motion, that the bolt-head $i^{12}$, acting on the lug of arm $i^{11}$, will throw the shipper-rod $i^5$, disengage the clutch $I^3$, and stop the carriage, while at the same time the spiral lugs $i^{13}$ $i^{14}$ push the shaft $i^{10}$ outward, so that the bolt-head and lug will not engage again until the shaft is again pushed in, the spiral lugs being long enough to withdraw the shaft the proper distance and the blow of the bolt-head being sufficient to throw the shipper-shaft through the angle covered by the spiral lugs. The slot and bolt $i^{12}$ are so located with reference to the cam that the carriage will be automatically stopped at the point of reverse, the slot allowing this adjustment to be made to a nicety.

Hung in bearings on the set-roll hanger G', just back of the set-roll and parallel with it, is a light shaft, S, Fig. 6, which has fingers $s$ projecting from one side of it, which come forward to within an inch (more or less) of the center of the set-roll, and which are so placed on the shaft as to come between the circular rows of teeth on the set-roll. Extending back from this shaft is an arm, $s'$, which has depending from it a link, $s^2$, the lower end of which is adjustably connected to another arm, $s^3$, pivoted a little farther back on an ear, $s^4$, depending below the carriage-base E. This arm $s^3$ extends forward under the carriage-base and terminates just above the sliding shipper-rod $i^5$. Fastened adjustably by set-screw upon the shipper-rod is a lug, $s^6$, adapted to engage the arm $s^3$.

The connections between the arm $s^3$ and the fingers $s$ are so maintained that when the fingers stand a little above the points of the teeth on the set-roll the arm $s^3$ will fall nearly to the top edge of the shipper-rod $i^5$ and be in range for engagement with the lug $s^6$, and that when the fingers are depressed to the level of the points of the teeth the end of arm $s^3$ will be lifted out of range of the lug $s^6$. It will be seen that when there is a block between the set-rolls the fingers will be depressed by it and the arm lifted, so that the carriage may be reciprocated freely, and that as soon as the block is sawed up to a slab less in thickness than the distance from the plane of the saw to the points of the fingers the block will no longer restrain the fingers, and the weight of the link $s^2$ and arms will cause the arm $s^3$ to fall into range with the lug $s^6$, so that when the carriage comes back next the arm will strike the lug, throw the shipper, and stop the carriage. The ear $s^5$, cast upon the carriage-base, takes the blow when arm $s^3$ strikes lug $s^6$. The lug $s^6$ can be adjusted on the rod so the carriage will be stopped on the point of reverse or at the proper point for putting in a fresh block. The link $s^2$ is made adjustable at the lower end to accommodate different positions of the set-roll hanger G'.

Bolted to the main frame A is the side frame, A', Fig. 1, upon which at $l$ and a corresponding point above the frame A is journaled the shaft $l^2$, upon which is hung an ordinary jointer-wheel, L. The jointer-wheel is covered by the case $L^2$, provided with ledges $l^3$, upon which to lay the shingles while being jointed by pushing them through the slots $l^4$ in contact with the knives $l^5$ of the jointer-wheel. The case is pivoted at $l^6$, so that by removing the bolt $l^7$ it may be swung off the wheel. The jointer-wheel is driven by a belt connecting the pulley $c$ on the end of the saw-arbor with a corresponding pulley on the shaft $l^2$. The plate $L^3$ protects the operator from the knives $l^5$ and furnishes the outward bearing, $l^8$, for the shipper-shaft $i^{10}$.

Filling the space between the jointer-wheel case and the end of the side frame, A', is the shingle-box consisting of a plate, O, Fig. 1, which has riveted to its edges the angle-plates $p\ p'$, containing slots, through which pass bolts $p^2$, by which the plate is fastened to the machine, the slots permitting it to be adjusted vertically and the bolts acting as pivots, permitting its adjustment to or from the saw. Upon the top of the plate is a slide, $p^3$, adjustable by slot $p^5$, by which it is fastened to the plate by screws. The slide comes to an edge at the top and has a small place cut away, which permits the plate being set close to the saw without danger of the teeth catching. Upon the bottom of the plate is bolted a curved section of the same material, $O^2$, upon which the shingles fall and rest as they drop from the saw. Most of the sawdust goes down behind the slide and plate, and the shingle-box being all open except the bottom what sawdust falls into it is dislodged in the process of handling the shingles. The section $O^2$ is bolted to the plate O, because it is sometimes desirable in sawing stuff which is not to be jointed to let it slide away from the machine to save one handling.

The operation of the machine is as follows: The operator places one foot upon the treadle $f^2$, lifts the upper set-roll, adjusts the block between the rolls and drops the top roll upon the block by slipping his foot off the treadle, turns either shipper-lever to the right, which starts the carriage, when the mechanism described reciprocates the carriage and feeds forward the block until the operator throws one of the shippers to the left or pushes in the shaft of the rear shipper, which latter automatically stops the carriage at the proper point for renewing the block, or until the block is sawed up to a slab of thickness for which the fingers $s$ are set, when the carriage is automatically stopped at that point. The slowest feed is intended to be slow enough to permit one man to joint the shingles as fast as sawed, while the quickest feed may keep two men jointing and one selecting and replacing blocks.

The shape of the set-plate $F^5$ is such as to insure an easy motion of the setting mechanism at the finish of each setting, so that no matter how rapid the movement of the carriage there is no tendency to jerk the setting-gear, and thus feed the block forward unevenly.

The forward part of the cam $J^2$, Fig. 2, is so constructed as to give a uniform forward motion to the carriage. This feature is a great advantage over any crank-feed in which the speed of the carriage must increase from zero at the beginning to a maximum at the quarter and then decrease to the point of reverse. The latter method brings the hardest feed to bear on the saw when it is in the middle or hardest part of the cut. To say nothing of the uneven straining of the saw, if the saw will stand the maximum feed with a crank it would better stand a higher average feed, thus giving a clear increase of capacity in favor of the uniform cam-feed.

The forward part of the cam, as we preferably construct it, though it may of course be otherwise proportioned, occupies two-thirds of the angular space of the wheel and the return one-third, so the carriage is returned in half the time consumed in the cutting part of the stroke.

We do not hold ourselves to the construction above described, as it is evident that various changes may be made without departing from the spirit of our invention.

Having now described our invention, what we claim as new, and desire to secure by Letters Patent of the United States, is—

1. In a circular-saw machine, the combination of a reciprocating carriage, the cam $J^2$, constructed substantially as described, the oscillating lever $J^3$, having in its upper arm a slot, $K^3$, which is curved so as to lie in a circle, the center of which is at or near the pivot connecting the pitman to the carriage, and the rod or pitman K, pivoted at one end to the carriage and having the other end adjustable in the curved slot $K^3$, substantially as and for the purpose described.

2. In a circular-saw machine, the combination of the driving gear-wheel J, with the shaft I, a driving-pulley free to revolve on said shaft, a friction-clutch coupling, 13, a tooth-pinion, 15, fast on the shaft I, said gear-wheel J being provided with a cam, $J^2$, constructed substantially as described, and connected to the reciprocating carriage by means of rod or pitman K, and the oscillating lever $J^3$, having in its upper arm a slot, $K^3$, which is curved, so as to lie in a circle, the center of which is at or near the pivot connecting the pitman to the carriage, all substantially as described.

3. In a circular-saw machine, the combination, with the reciprocating carriage and its driving-gear, of the shipper-shaft $i^{10}$, and the arm $i^9$, having complementary spiral lugs $i^{13}$ $i^{14}$, the arm $i^9$, having a slot which engages a lug upon the shipper-rod $i^5$, the arm $i^9$ being also provided with the arm $i^{11}$, carrying a lug adapted to be tripped by a lug, $i^{12}$, upon the driving gear-wheel, all so arranged that the inward motion of the shaft $i^{10}$ operates by means of the lugs $i^{13}$ $i^{14}$ to throw the lug upon the arm $i^{11}$ in the path of the moving lug $i^{12}$, for the purpose of throwing the shipper-rod $i^5$ and stopping the carriage, substantially as described.

4. In a circular-saw machine, a shaft, S, having the fingers $s$ so arranged as to be automatically depressed by the presence of a block between the set-rolls, in combination with the arm S', link $S^2$, arm $S^3$, and the sliding shipper-rod $i^5$, carrying the lug $S^6$, all so arranged that as soon as the pressure is removed from the fingers the arm $S^3$ is allowed to fall in the path of the lug $S^6$, upon the return-stroke of the carriage, thereby throwing the shipper-rod $i^5$, and stopping the carriage, substantiallly as described.

5. In a circular-saw machine, the set-rolls provided with ratchet-wheels $h^3$, secured to the hubs of the rolls, the pawls $h^4$, operating the ratchets by means of the splined shaft $F^2$, feathered sleeves $G^3$, and their connections, in combination with the adjustable curved set-plate $F^5$, all so arranged as to set the rolls upon the forward stroke of the carriage, substantially as described.

6. In a circular-saw machine, the vertically-adjustable shingle-box consisting of the slotted side flanges, $p\ p'$, bolts $p^2$, the plate O, and the removable bottom $O^2$, in combination with the adjustable slide $p^3$, arranged to guide the shingles into the box and separate them from the dust, substantially as described.

In testimony whereof we have signed our names to this specification, in the presence of subscribing witnesses, on the 22d day of August, 1885.

DENISON CHASE.
WM. L. CHASE.

Witnesses:
FRED. C. TENNEY,
HOLLIS H. GESS,
CHARLES D. PARKER,
FRANK A. FOSTER.